United States Patent
Singi et al.

(10) Patent No.: US 11,157,247 B2
(45) Date of Patent: Oct. 26, 2021

(54) CRYPTOGRAPHIC DIGITAL TWIN SEGREGATION SYSTEM FOR DEVELOPMENT OPERATIONS

(71) Applicant: Accenture Global Solutions Limited, Dublin (IE)

(72) Inventors: Kapil Singi, Bangalore (IN); Vikrant Kaulgud, Pune (IN); Swapnajeet Gon Choudhury, Bangalore (IN); Jagadeesh Chandra Bose R. P., Karnataka (IN); Vibhu Saujanya Sharma, Bangalore (IN); Sanjay Podder, Thane (IN); Adam Patten Burden, Tampa, FL (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 116 days.

(21) Appl. No.: 16/775,073

(22) Filed: Jan. 28, 2020

(65) Prior Publication Data
US 2020/0401383 A1      Dec. 24, 2020

(30) Foreign Application Priority Data

Jun. 19, 2019    (IN) .............................. 201941024347

(51) Int. Cl.
*G06F 8/36* (2018.01)
*G06F 8/70* (2018.01)
*H04L 9/06* (2006.01)

(52) U.S. Cl.
CPC ................. *G06F 8/36* (2013.01); *G06F 8/70* (2013.01); *H04L 9/0637* (2013.01); *H04L 9/0643* (2013.01); *H04L 2209/38* (2013.01)

(58) Field of Classification Search
None
See application file for complete search history.

(56) References Cited

U.S. PATENT DOCUMENTS

2017/0372300 A1* 12/2017 Dunlevy ................ G06Q 20/36
2019/0342084 A1* 11/2019 Mehedy ................ H04L 9/0643
(Continued)

OTHER PUBLICATIONS

Hepp et al., "On-chain vs. off-chain storage for supply-and blockchain integration," Nov. 12, 2018, p. 283-291. (Year: 2018).*

*Primary Examiner* — Qing Chen
(74) *Attorney, Agent, or Firm* — Crowell & Moring LLP (57) ABSTRACT

System and methods for cryptologic digital twin segregation with blockchain for development operations are provided. By way of introductory example, a system may receive a first development object from a first devops tool and a second development object from a second devops tool. The system may identify, in a segregation model graph, a first node and a second node, the first node corresponding to the first development object and the second node corresponding to the second development object. The system may determine the first node is mapped to an off-chain storage classification and the second node is mapped to an on-chain storage classification. The system may store the first development object in an off-chain storage, generate a hash value of the first development object, and store the hash value of the first development object on a blockchain. The system may store the second development object on the blockchain.

20 Claims, 8 Drawing Sheets

(56) References Cited

U.S. PATENT DOCUMENTS

| | | | |
|---|---|---|---|
| 2020/0007312 A1* | 1/2020 | Vouk | H04L 67/104 |
| 2020/0028688 A1* | 1/2020 | Takada | H04L 9/3247 |
| 2020/0042958 A1* | 2/2020 | Soundararajan | G06Q 20/06 |

* cited by examiner

```
{
    "Policies":
    {
        "Project":
        {
            "Schedule":
            {
                "TF": "30%",
                "Before-time": {
                    "Within-0-75%": "100%",
                    "Within-75-100%": "50%"
                }
            }
        },
        "Product":
        {
            "Quality":
            {
                "TF": "70%",
                "Test-coverage":
                {
                    "TF": "50%",
                    "Coverage": {
                        "Within-75-90%": "80%",
                        "Above-90%": "100%"
                    }
                }
                "unit-test-coverage":
                {
                    "TF": "50%",
                    "Coverage": {
                        "Within-75-90%": "80%",
                        "Above-90%": "100%"
                    }
                }
            }
        }
    }
}
```

CRYPTOGRAPHIC DIGITAL TWIN SEGREGATION SYSTEM FOR DEVELOPMENT OPERATIONS

CROSS REFERENCE TO RELATED APPLICATIONS

This application claims the benefit of India Provisional Application No. 201941024347 filed Jun. 19, 2019, the entirety of which is incorporated by reference herein in its entity.

TECHNICAL FIELD

This disclosure relates to distributed ledger technology and, in particular, to blockchain storage and development operations systems.

BACKGROUND

Rapid advances and the rise in popularity of development operations (devops) has resulted in large numbers of market-available devops tools to automate and refine devops processes. Devops tools provide rich features for managing various aspects of software development and operations. However, the distributed and fragmented nature of devops tools result in siloed information and inefficient integration across multiple devops tools. Moreover, the performance, cost, and other features of devops tools frequently change in response to new and disruptive standards, best practices, and technologies. As technological standards evolve, an organization may seek to switch devops tools in order to improve efficiency, quality, and/or other workflow criteria. The fluidity of adopted devops practices and tools contribute to problems with providing consistency, traceability, efficiency, and reliability in automated development operations.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Software development and operations (devops) may generate a vast amount of information stored and managed by multiple devops tools. Devops tools may provide interfaces for managing various aspects of software development and operations. The distributed nature and the separation of concerns between devops tools may impede efficient integration of devops tools, automation of software development practices, and reliable tracking of historical software development information. These drawbacks further cause problems with automating various aspects of software development because of the technical challenges involved with proving historical activity in development operations.

Accordingly, there is disclosed digital systems and methods for cryptologic digital win segregation with blockchain. By way of introductory example, a system may receive a first development object from a first devops tool and a second development object from a second devops tool. The system may identify, in a segregation model graph, a first node and a second node, the first node corresponding to the first development object and the second node corresponding to the second development object. The system may determine the first node is mapped to an off-chain storage classification and the second node is mapped to an on-chain storage classification. In response to the first node being mapped to the off-chain storage classification, the system may store the first development object in an off-chain storage, generate a hash value of the first development object, and store the hash value of the first development object on a blockchain. In response to the second node being mapped to the on-chain storage classification, the system may store the second development object on the blockchain.

A technical advancement of the system and methods described herein is that the system may generate digital twin(s) of the development objects which are segregated between on-chain and off-chain storages. For the on-chain storage, the immutable, redundant, and secure nature of blockchain may provide a historical ledger of development activity, which can be combined with other technologies, such as a smart contract, to provide automated policy enforcement. The mutability provided by off-chain storage may enable efficient read/write access, versioning, and fast processing times for other CRUD (create, read, update, and delete) operations. For example, the off-chain storage may be better suited for storage of source code, test cases, design documents, and/or other development assets subject to frequent versioning and/or large file sizes The combination of off-chain and on-chain storage provide additional technical challenges that are addressed by technical advancements provided by the system and methods described herein. For example, a hash value of a development object stored in the off-chained storage may be used to index and/or validate the development object. The hash value may be stored on the blockchain. Smart contracts may access the hash value to perform verification operations that verify the integrity and other criteria associated with development objects stored in the off-chain storage.

Another example of a technical advantage of the system and methods provided herein are automated policy enforcement that accesses devops object information from both on-chain and off-chain storages. For example, the blockchain may include smart contracts that reward participant activity when one or more predefined criteria is satisfied. In some examples, the smart contracts may verify that particular development objects are stored in the off-chain storage. By way of example, the smart contract may verify that source code, user stores, and other information are validly stored on in the off-chain storage prior to rewarding a developer who constructed the source code.

The systems and methods described herein offer improvements over existing solutions. The additional benefits, efficiencies, and improvements over existing market solutions are made evident in the systems and methods described below.

Figure 1:
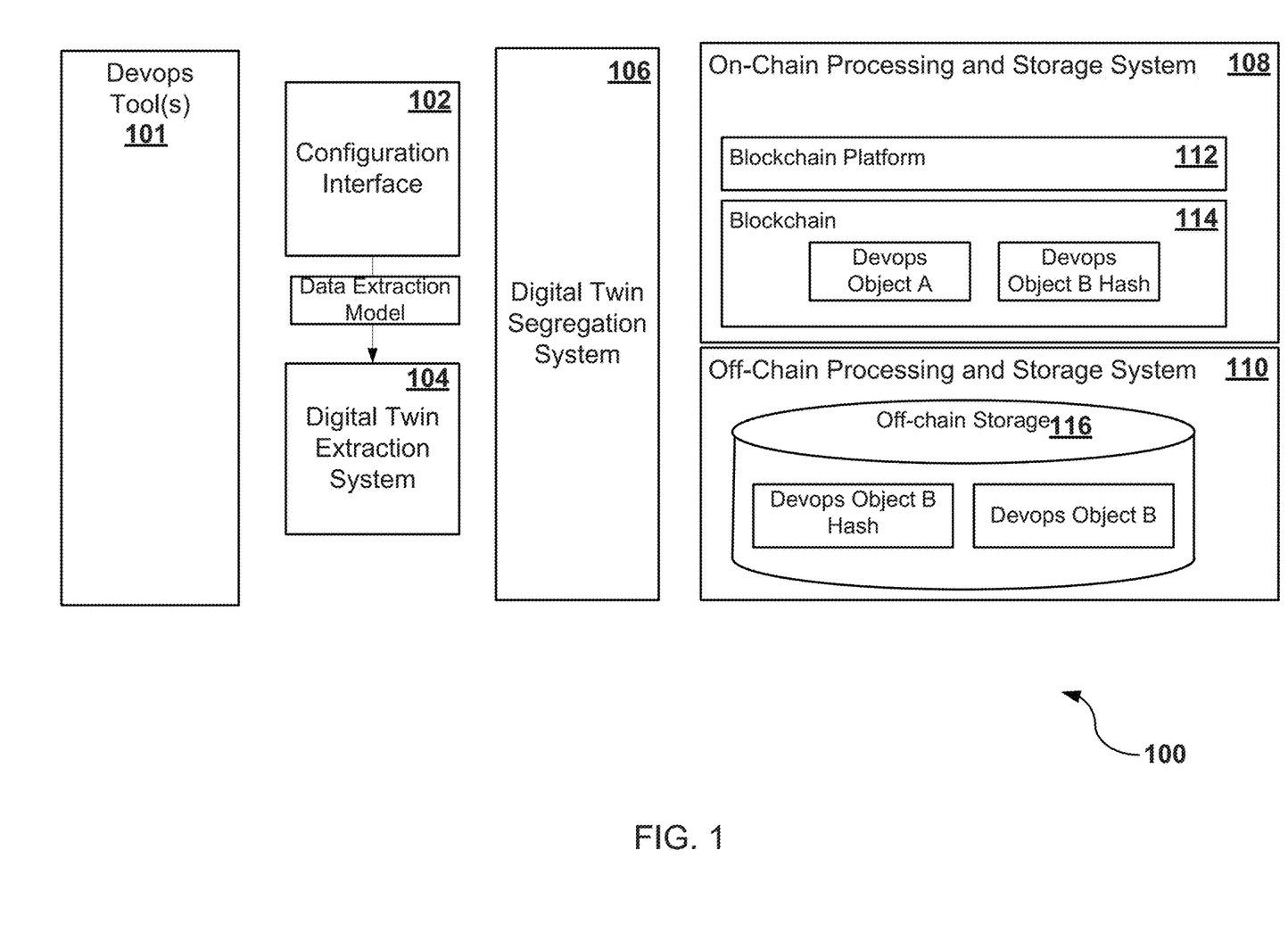
FIG. 1 illustrates a first example of a system.

FIG. 1 illustrates a first example of a system 100. The system may include on one or more devops tools 101. A devops tool(s) 101 may include an on-premises and/or cloud-based computer implemented service that automates development operations, tracks development progress, stores project information, or otherwise assists with development. For example, a devops tool may include a system to plan, create, verify, store, version, package, release, configure, and/or monitor software development. Communication with the devops tool(s) 101 may occur via to a procedural call, a message, or any other type of invoking communication with the devops tool.

Table 1 provides various types and examples of devops tools. It should be appreciated that there are many more devops tools available for various types of development activities.

TABLE 1

Devops Tools

| Devops Category | Examples |
|---|---|
| DevOps Orchestrator | JENKINS, SAP, SOLUTION MANAGER |
| User Requirements and Stories | JIRA, SERVICE NOW, CONFLUENCE |
| Object Version Management | GITHUB, SAP CHARM, BITBUCKET |
| Code Quality & Security | VIRTUAL FORGE, SONARQUBE, FORTIFY |
| Testing | WORKSOFT, SELENIUM, TOSCA |

In some examples, the devops tool(s) 101 may be configured to communicate with each other and/or in an integrated environment for a project or organization. For example, the devops tool(s) 101 for a project or organization may be included in a toolchain. A toolchain may include a selected configuration of devops tools to implement development operations. Devops tools may, for example, be executed in a sequence based on the devops workflows of an organization or project. The input to a subsequent devops tool in the toolchain may be derived from (or include) an output from a preceding devops tool in the toolchain.

Devops tool(s) 101 may provide interfaces for managing and accessing development information. As defined herein, a unit of information for a software development project is a development object. A development object may include a unit of information managed and/or made available by a devops tool. For example, a devops tool may provide development objects via API call or other communications interfaces. In various examples, the development objects may include assets, participant information, and/or development policies. An asset, as defined herein, may include a digital representation of a work product for a software development including, for example, source code, test cases, user stories, design documents, project tasks, and/or other work product of a software project. Participant information may include identifiers of participants or other resources assigned to create or manage the development assets. For example, the participant information may include identifiers of personnel, roles, and the like. In some examples, the participant information may further identify assignments to tasks and/or development activities.

Figure 2:
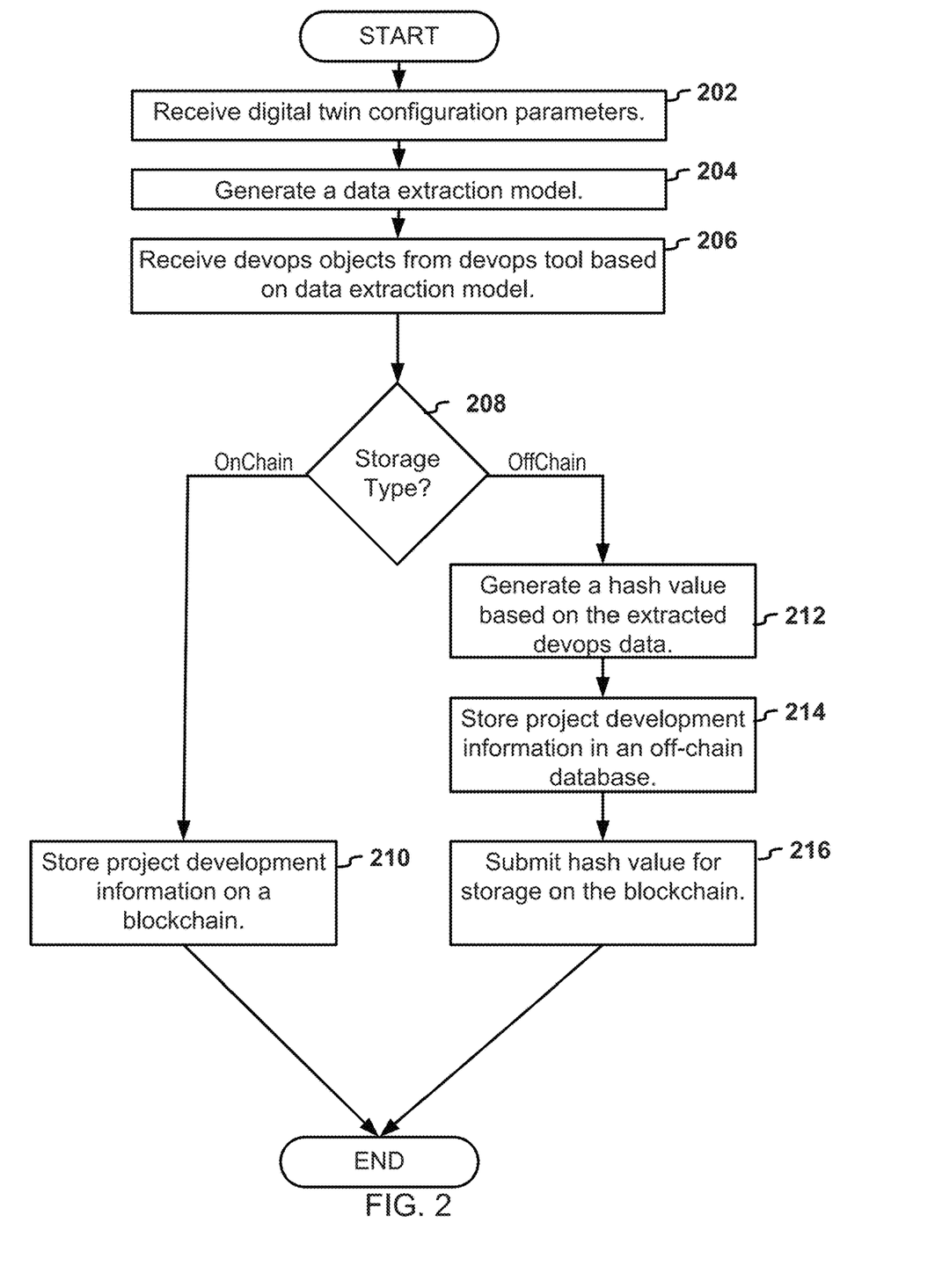
FIG. 2 illustrates a first flow diagram of example logic for a system.

The system may further include a configuration interface 102, a digital twin extraction system 104, a digital twin segregation system 106, an on-chain processing and storage system 108, and/or an off-chain processing and storage system 110. Refer to FIG. 2 and the related discussion for further description of the interactions between these components.

The on-chain processing and storage system 108 may be a blockchain 114 and a blockchain platform 112. The blockchain 114 may include datablocks that are linked according to a cryptography. The arrangement of datablocks and associations between information stored in the datablocks are established by the blockchain platform 112. For example, the blockchain 114 may provide a growing, shared digital data flow, which serves immutable storage on multiple distributed computer systems. Depending on the technology of the blockchain platform 112, the datablocks of the blockchain 114 may include a genesis datablock that is the initial datablock of the blockchain. Successive datablocks may be appended to the blockchain 114 over time. The blockchain 114 may provide a chronological ledger of information. One or more of the successive datablocks may include a hash of a previous datablock, a hash of a header of the previous datablock, and/or a hash of portions of the previous datablock. Modifications to one or more datablocks in the blockchain 114 may cause inconsistencies in the hashed information stored in the successive datablocks. The inconsistencies may be detected by the other participant nodes to invalidate transactions submitted to the blockchain.

The blockchain platform 112 may validate the blockchain 114 based on consensus among multiple distributed computer systems that implement local corresponding instances of the blockchain platform 112. For example, the blockchain platform 112 may receive transactions or a transaction that includes information to be stored on the blockchain 114. The blockchain platform 112 may process the transaction based on a consensus protocol. For example, the blockchain platform 112 may communicate with other instances of the blockchain platform 112 on other computer systems. The blockchain platform 112 may validate transactions and/or synchronize changes to the blockchain 114 with remote blockchain(s) on other computer systems such that each participant node includes update-to-date blockchains. Alternatively or in addition, the blockchain platform 112 may provide user interfaces, application programming interfaces (APIs), services related to management of the blockchain (or blockchains). Examples of the blockchain platform 112 may include Hyperledger, Ethereum, and/or other custom developed implementations.

The off-chain processing and storage system 110 may include an off-chain storage 116. The off-chain storage 116 may include a database and/or memory where information is not arranged in blockchain format. For example, the off-chain storage 116 may include a relational or non-relational database, a document database, or any other type of database that does not store information in a blockchain format. Alternatively or in addition, the off-chain storage 116 may include a storage where information is mutable. In other words, information stored in the off-chain stage may be subsequently updated without invalidating other information stored in the off-chain storage 116.

In some examples, the off-chain storage 116 may store development objects and respective hash values of the development objects. For example, the development objects stored in the devops database may be indexed by their hashes. Thus, the off-chain storage 116 may be queried to find a development object(s) based on its hash value. Alternatively or in addition, the hash value may also be used to verify the integrity of the development object stored in the blockchain.

FIG. 2 illustrates a first flow diagram of example logic for the system 100. Reference to FIG. 1 is made throughout the following discussion of FIG. 2. The configuration interface 102 may receive digital twin configuration parameters and policy configuration parameters (202). The digital twin configuration parameters may include information that identifies the devops tools 101 and/or development objects that are relevant to for a digital twin of a development object or collection of devops objects. For example, the digital twin configuration parameters received by the configuration interface 102 may identify the types of development objects provided by each of the devops tools 101. Alternatively or in addition, the configuration interface 102 may include identifiers, credentials, network addresses, accounts, or other information used to access the devops tools 101.

In some examples, the digital twin configuration parameters may further include a selection of particular development objects. For example, the devops tools may provide multiple types of development objects for the project. In various examples, some development objects may be deemed esoteric, redundant, or not relevant for any of a variety reasons. The configuration parameters received by the configuration interface 102 may specify which development objects are relevant and/or which development objects are not relevant.

The configuration interface 102 may generate a data extraction model (204). For example, the configuration interface 102 may compile the configuration parameters into the data extraction model. The data extraction model may include a specification that enables retrieval of selected data objects from corresponding devops tools. The data extraction model may specify the development object, devops tools, and/or instructions for communicating with the devops tools. For example, the data extraction model may include mappings between development objects identifiers and identifiers of devops tools. Alternatively or in addition, the data extraction model may include credentials for accessing a devops tools. In some examples, the data extraction model may have instructions for accessing or querying information made accessible by a development tool (via API, database calls, or some other framework).

The digital twin extraction system 104 may access the data extraction model to receive development objects from one or more devops tool. The digital twin extraction system 104 may identify, in the devops extraction model, the identifiers of the development objects, the devops tool(s) that generate/store the development objects, and parameters for accessing the development objects from the devops tool. Thus, the digital twin extraction system 104 may establish a data flow of development objects from multiple development tools based on the data extraction model.

The digital twin extraction system 104 may receive development objects from one or more devops tool (206). For example, the digital twin extraction system 104 may establish communication with one or more devops tools and query the devops tools for development objects, as identified in the data extraction model. The digital twin extraction system 104 may communicate the received development objects to the digital twin segregation system 106.

The digital twin segregation system 106 may determine whether the storage type for the development objects is on-chain or off-chain (208). See FIGS. 3-4 and the related discussion for more information regarding determining the storage type.

In response to the determined storage type being on-chain (208, OnChain), the on-chain processing and storage system 108 may store the development object on the blockchain 114 (210). For example, the on-chain processing and storage system 108 may append the development objects, or information included in the development objects, to the blockchain 114. Alternatively or in addition, the on-chain processing and storage system 108 may submit a transaction to a blockchain platform 112 that includes the devops object information. The blockchain platform 112 may establish consensus with other computer systems that implement the blockchain platform 112 and append the transaction to the blockchain 114.

In response to the determined storage type being off-chain (208, OffChain), the off-chain processing and storage system 110 may execute operations 212-216. For example, the off-chain processing and storage system 110 may generate a hash value of the extracted devops data (212). The hash value may include a fixed length value determined based on a hashing function. In some examples, the hash value may uniquely identify the extracted devops data, and thus, may be mapped to the devops data as a foreign or primary key. Alternatively or in addition, the hash value may be used to determine the integrity of data. For example, data can be applied to a hashing function, and the resultant hash value compared with a previously generated hash value. If the two hash values are not the same, there is a problem with the data.

The off-chain processing and storage system 110 may store the development object and/or the hash value in the off-chain storage 116 (214). The off-chain storage 116 may be queried to identify the development object based on the hash of the development object.

The on-chain processing and storage system 108 may submit the hash value for storage on the blockchain 114 (216). The blockchain 114 may store an immutable record of the hash value on the blockchain 114. Thus, subsequent operations may rely on the hash value to verify the presence and integrity of information stored in the off-chain storage 116.

Figure 3:
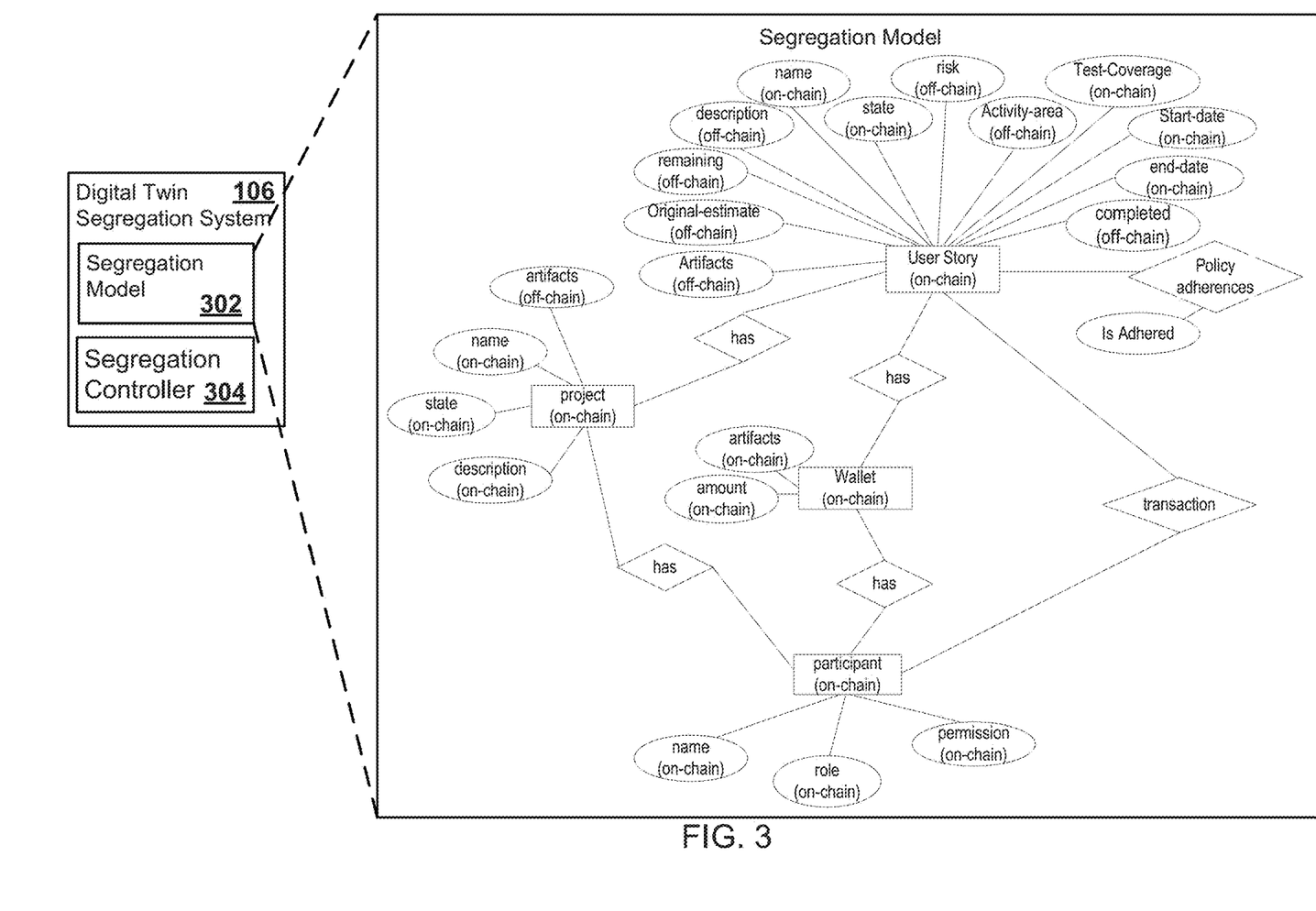
FIG. 3 illustrates an example of a digital twin segregation system.

FIG. 3 illustrates an example of the digital twin segregation system 106. The digital twin segregation system 106 may include a segregation model 302 and a segregation controller 304. The segregation model 302 may include a data structure that represents relationships between one or more development objects. For example, the segregation model 302 may include a graph or some other suitable data structure.

The segregation model 302 may include a plurality of nodes. The nodes of the segregation model 302 may represent development objects or types of development objects. For example, the nodes of the segregation model 302 may represent human resources, tasks, work product, assets, user stores, design documents, development policies, an/or any other work product, artifact, or types of development objects descriptive of a software development project. The information corresponding to each of the nodes may be managed by one or more devops tools. The segregation model 302 may include mappings between the nodes to designated associations between related data. In examples where the segregation model 302 is a graph, the mappings between nodes may be edges that link at least two nodes.

In some examples, the nodes of the segregation model 302 may include (or be associated with) a storage descriptor. The storage descriptor may identify the type of storage for information associated with the node. For example, the storage descriptor may specify "on-chain" or "off-chain" storage. Thus, when a development object is received that is represented by a node of the segregation model 302, the storage descriptor may specify the type of storage for the development objects. In circumstances where the storage descriptor specifies on-chain storage, the segregation controller 304 may cause the development objects to be stored on a blockchain 114. In circumstances where the storage descriptor specifies off-chain storage, the segregation controller 304 may cause the development objects to be stored in the off chain database.

Figure 4:
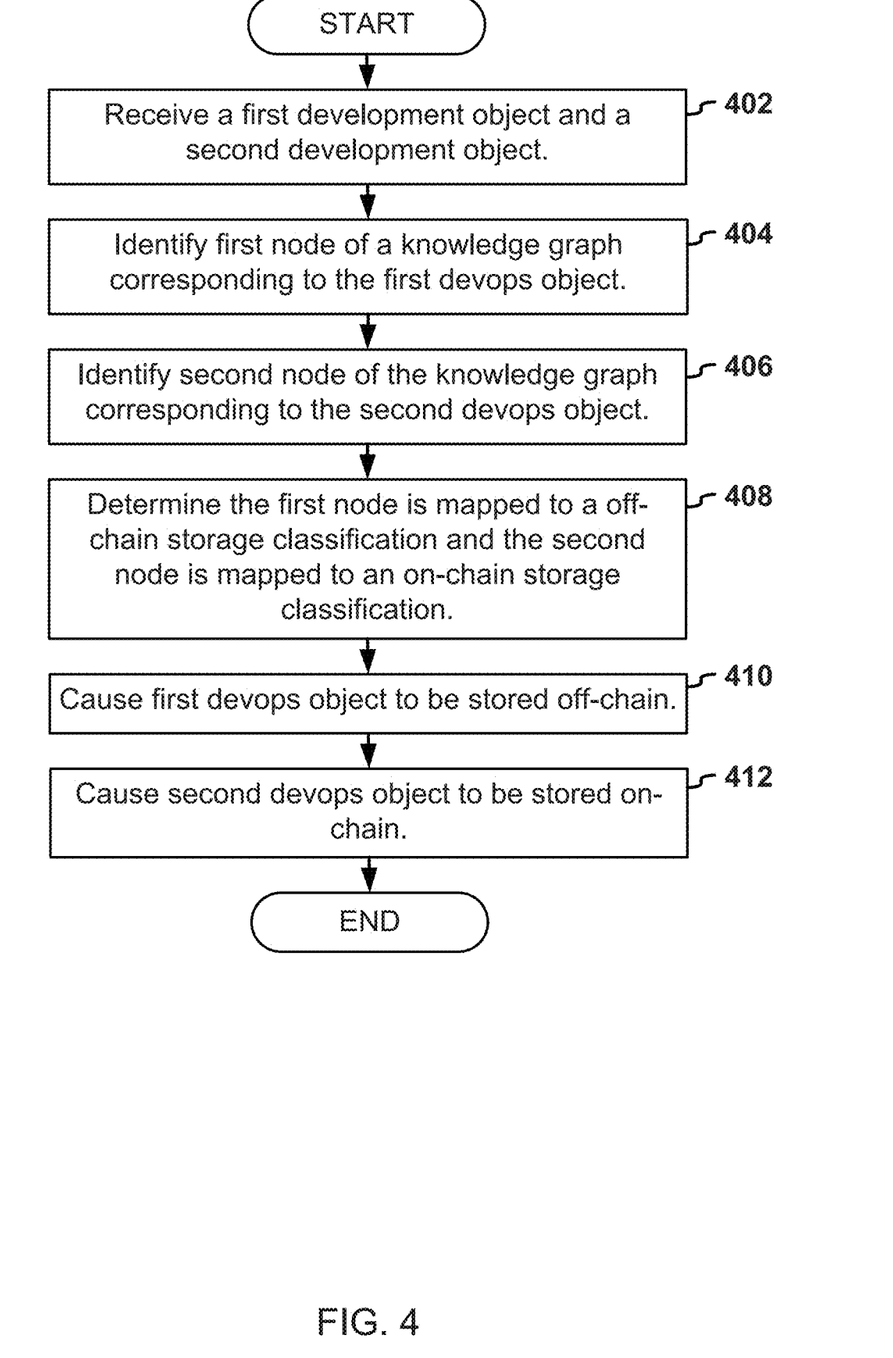
FIG. 4 illustrates a flow diagram of example logic for a digital twin segregation system.

FIG. 4 illustrates a flow diagram of example logic for the digital twin segregation system 106. The segregation controller 304 may receive first and second development objects (402). The first and second development objects may be related in a development project, but stored and/or managed by separate devops tools. For example, the first development object may include source code for a development project and the second development object may include a software artifact for the development project. Alternatively or in addition, the first development object may include an identifier of a participant (i.e. developer) and the second development object may include test case created by participant. In other examples, the development objects may include any other combination of assets, participants, or examples of development objects.

The segregation controller 304 may identify a first node of the knowledge graph that corresponds to the first object (404). The segregation controller 304 may identify a second node of the knowledge graph that corresponds to the second development object (406).

The development objects may be associated with corresponding development object identifiers. Likewise, the nodes of the knowledge graph may be associated with the development object identifiers. Thus, the segregation controller 304 may query the knowledge graph for nodes based on the development objects identifiers. In some examples, the development object identifiers may be passed to the segregation controller 304 as a parameter. The segregation controller 304 may identify a node in the segregation model 302 that corresponds to the object type. The segregation controller 304 may further identify the storage descriptor included in (or associated with) the identified node.

The system may determine the first node is mapped to an off-chain storage classification and the second node is mapped to an on-chain storage classification (408).

As previously discussed, the nodes of the segregation knowledge graph may be associated with storage descriptors to signify the type of storage for each development objects type. The on-chain storage classification may represent be a state of the storage descriptor when the storage descriptor indicates on-chain storage. The off-chain storage classification may represent be a state of the storage descriptor when the storage descriptor indicates off-chain storage.

The segregation controller 304 may cause the first development object to be stored off-chain in response to the first node being mapped to the off-chain storage classification (410). For example the segregation controller 304 may communicate the development objects to the off-chain processing and storage system 110. The off-chain processing and storage system 110 may store the first development object in the off-chain storage 116.

The segregation controller 304 may cause the second development object to be stored on-chain in response to the second node being mapped to the on-chain storage classification (412). For example the segregation controller 304 may communicate the second development object to the on-chain processing and storage system 108. The on-chain processing and storage system 108 may store the second devops object on the blockchain 114.

Figure 5:
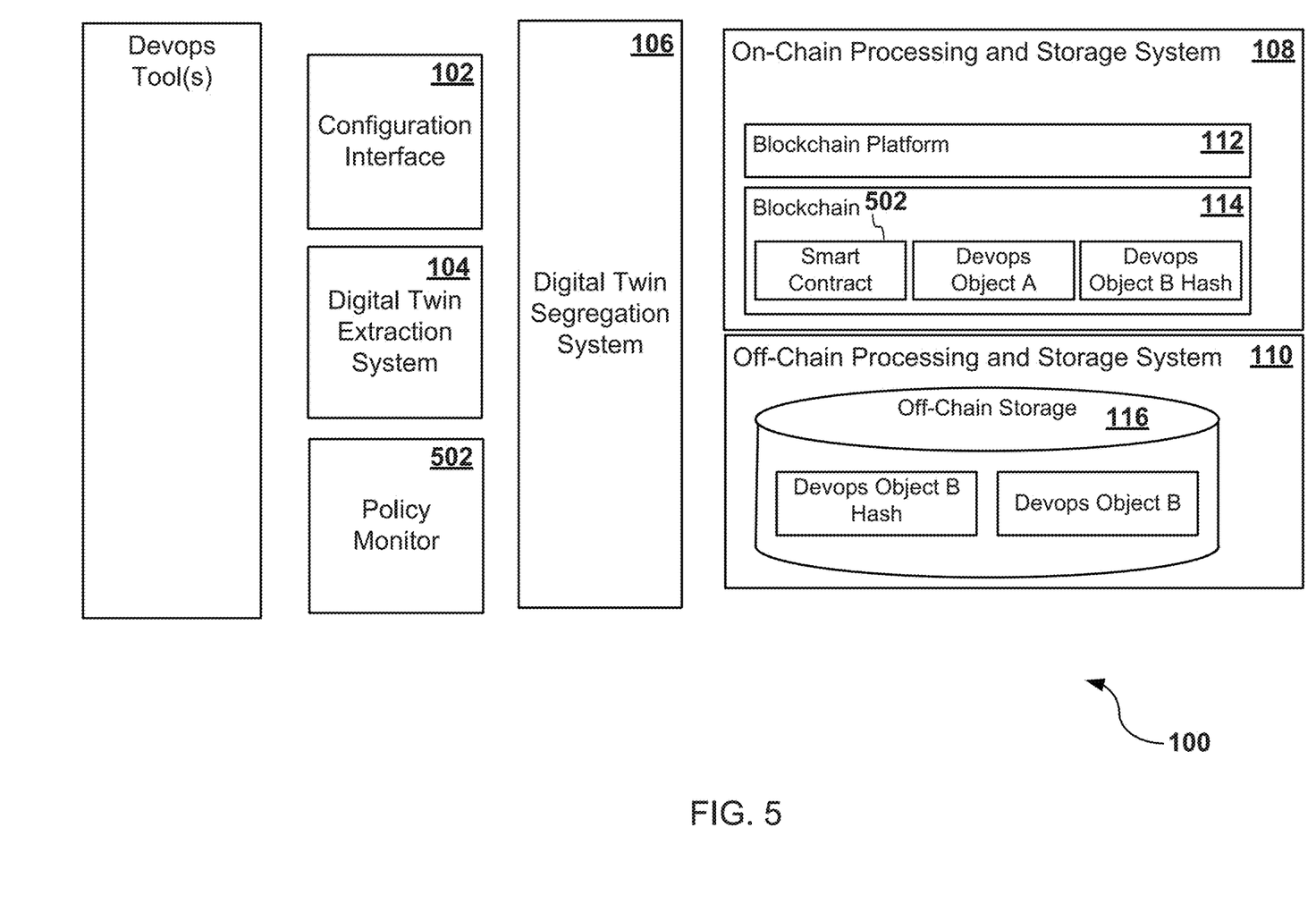
FIG. 5 illustrates a second example of a system.

FIG. 5 illustrates a second example of the system 100. The system may include a policy monitor 502.

In various examples, one or more devops tools may include event information. The event information may include information that indicates or measures progress, quality, and/or status of software development and/or operations activity. In some examples, the event information may include a metric. The metric may, for example, include number of lines of code, test coverage percentage, development time, number of completed user stores, and the like.

The system may include a policy monitor 502. The policy monitor 502 may detect event information that is relevant to a development policy. A development policy may include a set of rules, conditions, and/or criteria that establish an acceptable standard for an asset, or development efforts of the asset. The policy may establish, for example, threshold values that may be compared to metrics included in the event information to determine whether the policy is satisfied.

In some examples, the blockchain 114 may include a smart contract 504. The smart contract 504 may include logic for implementing a development policy. For example, the smart contract 504 may receive the event information detected by the policy monitor 502 (or received directly from a devops tool, depending on the implementation). The logic may cause the smart contract 504 to perform various operations in response to the development event. For example, the smart contract 504 may access a development policy to determine whether requisite conditions have been satisfied to perform a particular action.

By way of example, the smart contract 504 may cause tokens to be transferred to a developer account in response to completion of a project, activity, or task. The account may include, for example, a wallet or some other account where transactions for the account are tracked on the blockchain 114. The smart contract 504 may scale the amount of tokens based on various attributes, such as test coverage, completion time, and the like.

Figure 6:
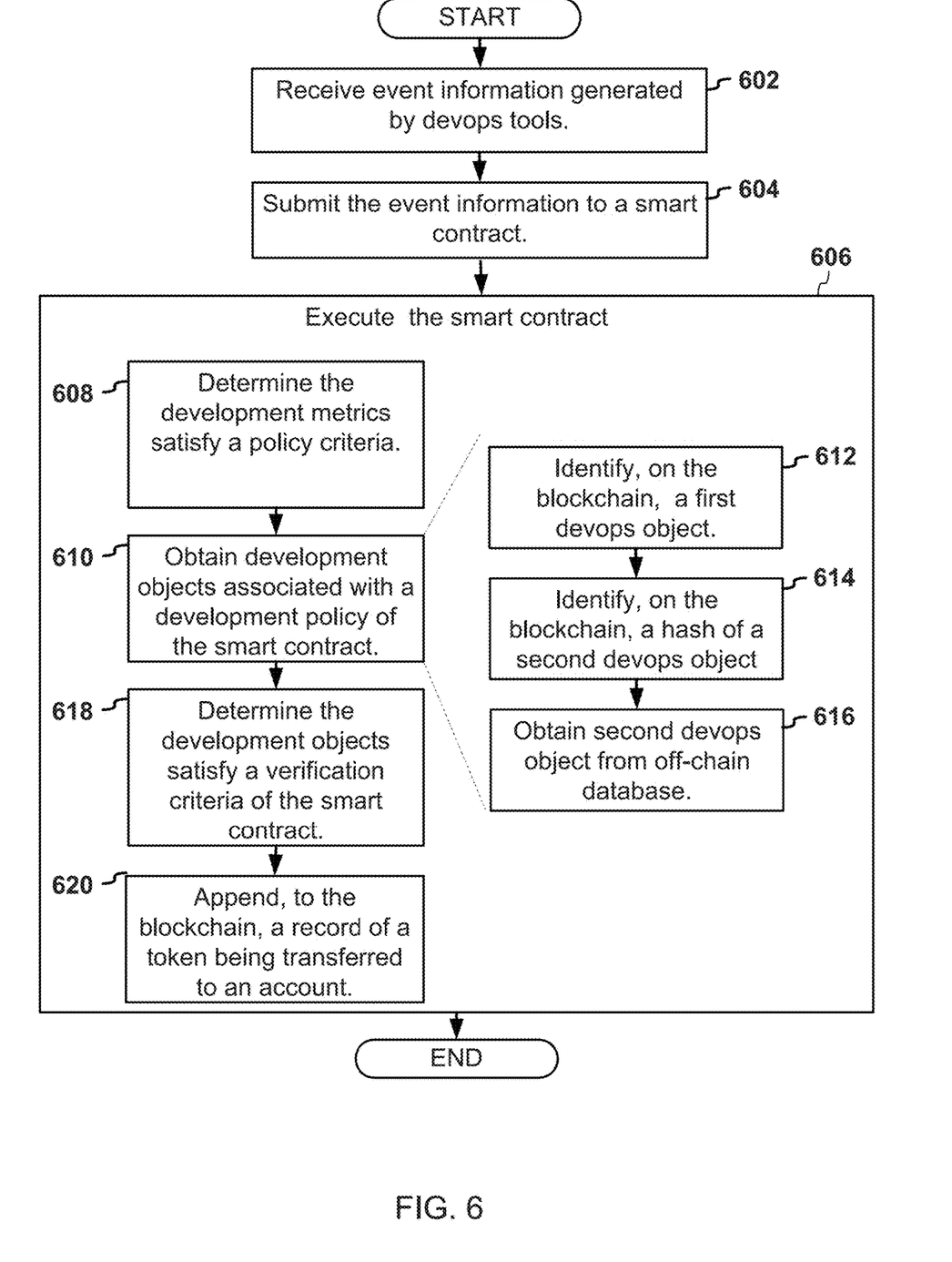
FIG. 6 Illustrates a second flow diagram of example logic for a system.

The smart contract 504 may perform additional or alternative operations related to verification of information stored on the blockchain 114 or in the off-chain storage 116, as further described in FIG. 6 and the related discussion.

FIG. 6 illustrates a second flow diagram of example logic for the system. The policy monitor 502 may receive event information generated by one or more devops tools (602). In response to receipt of the event information, the on-chain storage and processing system may submit the event information to a smart contract 504 (604). For example, the on-chain storage and processing system may receive the event information from the policy monitor 502 and/or the digital twin segregation system 106. In response to receipt of the event information, the on-chain storage and processing system may identify a smart contract 504 corresponding to the event information and the event information to a smart contract 504 (i.e. via API call or some other procedural call.)

The on-chain storage and processing system may execute the smart contract 504 (606)

Figure 7:
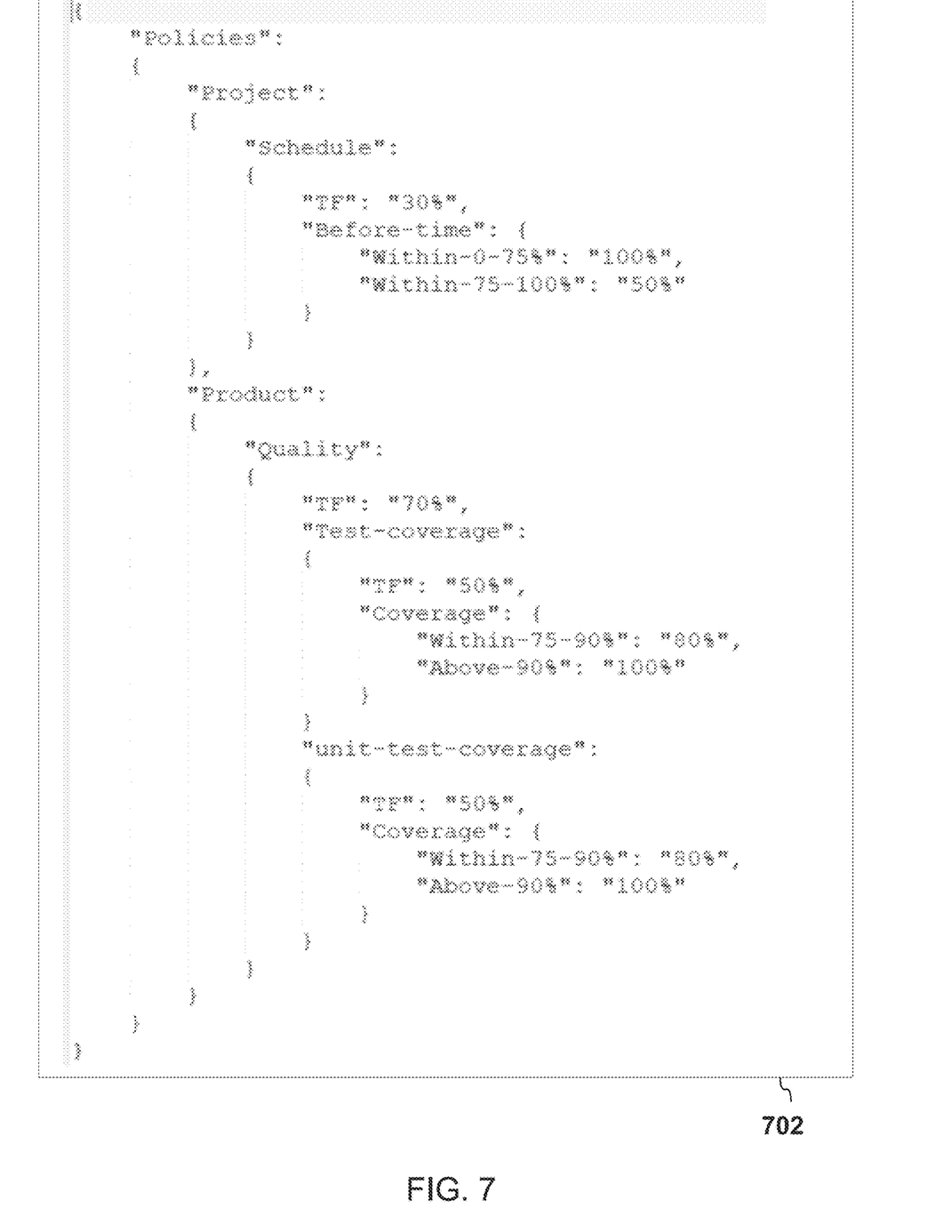
FIG. 7 illustrates an example of a policy criteria.

The smart contract 504 may determine the development event information satisfies a policy criteria (608). The policy criteria may include conditional logic, predetermined threshold values, and/or logical operators. For example, the policy criteria may compare the event information threshold performance values. Refer to FIG. 7 for an example of a policy criteria 702.

In some examples, performance of the smart contract 504 may be dependent on verification of one or more development objects. Verification of development objects may include verifying the presence of, or integrity of, the development objects previously stored on the blockchain 114 or in the official database.

Accordingly, the smart contract 504 may obtain development objects associated with the smart contract 504 (610). In some cases, the development objects may be stored off-chain or both on-chain and off-chain. To obtain the development objects, the smart contract 504 may execute operations 612-616.

The smart contract 504 may identify, on the blockchain 114 a first development object (612). The first development object may be stored on the blockchain 114. However, other development objects(s), such as a second development object may be stored off-chain.

The smart contract 504 may identify, on the blockchain 114, the hash value of a second development object (614). The hash value may have been previously stored on the blockchain 114 when the second development object was generated and/or stored in the off-chain storage 116.

The smart contract 504 may obtain the second development object from the off-chain storage 116 (616). For example, the smart contract 504 may cause the off-chain storage 116 to be queried based on the hash value.

After the first and second development objects are obtained, the smart contract 504 may verify the development objects satisfy a verification criteria (618). The verification criteria may include predetermined rules that evaluate the presence of the development objects and/or the integrity of the development objects. For example, the verification criteria may access the hash function that generated the hash value. The verification criteria may apply the second devops object obtained from the off-chain storage 116 to the hash function to generate a hash value. The verification criteria may compare the newly generated hash value to the previously generated hash value. If the hash values are the same, the data is verified, but if the hash values are different, the smart contract 504 may raise data inconsistency errors and/or abort execution of the smart contract 504.

In response to satisfaction of the verification criteria, the smart contract 504 may append, to the blockchain 114, a record of a token being transferred to a user account (620). For example, the smart contract 504 may cause tokens corresponding to an account associated with a project to a developer who completed the project, or a task associated with the project. The token transfer may occur after determination that the policy criteria is satisfied and the verification criteria is satisfied.

FIG. 7 illustrates an example of a policy criteria 702. The policy criteria 702 may include logical operators, predetermined threshold(s), and/or other values that establish criteria for software development and operations. The policy criteria may be included in a smart contract to trigger execution of logic in the smart contract. Devops objects and/or development event information received from devops tools may be compared to the policy criteria to determine whether to execute the logic of the smart contract. For example, the development event information may include a metric that is measured against logic included in the policy criteria. By way of non-limiting example, the metric may include a measurement of test coverage and the software policy criteria may include "above 90%", as illustrated in FIG. 7.

Figure 8:
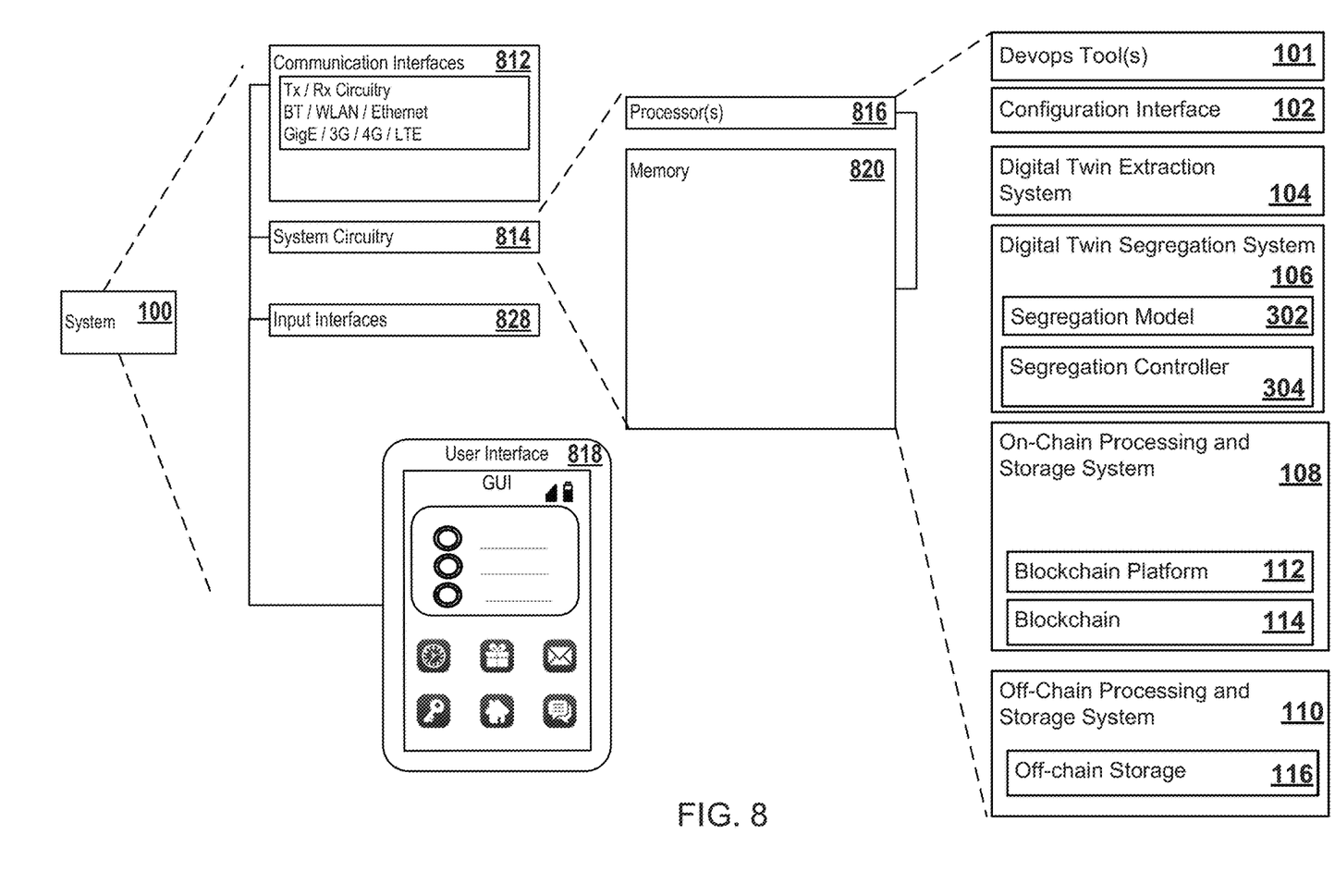
FIG. 8 illustrates a third example of a system.

The operations included in FIGS. 2, 4, and 6 may include additional, different, or fewer operations than illustrated in FIGS. 2, 4, and 6. The operations may be executed in a different order than illustrated in FIGS. 2, 4, and 6. Moreover, the system 100 may be implemented with additional, different, or fewer components than illustrated. Each component may include additional, different, or fewer components FIG. 8 illustrates a third example of the system 100. The system 100 may include communication interfaces 812, input interfaces 828 and/or system circuitry 814. The system circuitry 814 may include a processor 816 or multiple processors. Alternatively or in addition, the system circuitry 814 may include memory 820.

The processor 816 may be in communication with the memory 820. In some examples, the processor 816 may also be in communication with additional elements, such as the communication interfaces 812, the input interfaces 828, and/or the user interface 818. Examples of the processor 816 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 816 may be one or more devices operable to execute logic. The logic may include computer executable instructions or computer code stored in the memory 820 or in other memory that when executed by the processor 816, cause the processor 816 to perform operations of the configuration interface 102, the digital twin extraction system 104, the digital twin segregation system 106, the segregation model 302, the segregation controller 304, the on-chain processing and storage system 108, the blockchain platform 112, the blockchain 114, the off-chain processing and storage system 110, the off-chain storage 116, and/or the system 100. The computer code may include instructions executable with the processor 816.

The memory 820 is any non-transitory device for storing data and instructions, retrieving data and instructions, or any combination thereof. The memory 820 may include non-volatile and/or volatile memory, such as a random access memory (RAM), a read-only memory (ROM), an erasable programmable read-only memory (EPROM), or flash memory. Alternatively or in addition, the memory 820 may include an optical, magnetic (hard-drive), solid-state drive or any other form of data storage device. The memory 820 may include at least a part of at least one of the configuration interface 102, the digital twin extraction system 104, the digital twin segregation system 106, the segregation model 302, the segregation controller 304, the on-chain processing and storage system 108, the blockchain platform 112, the blockchain 114, the off-chain processing and storage system 110, the off-chain storage 116, and/or the system 100. Alternatively or in addition, the memory may include any other component or sub-component of the system 100 described herein.

The user interface 818 may include any interface for displaying graphical information. The system circuitry 814 and/or the communications interface(s) 812 may communicate signals or commands to the user interface 818 that cause the user interface to display graphical information. Alternatively or in addition, the user interface 818 may be remote to the system 100 and the system circuitry 814 and/or communication interface(s) may communicate instructions, such as HTML, to the user interface to cause the user interface to display, compile, and/or render information content. In some examples, the content displayed by the user interface 818 may be interactive or responsive to user input. For example, the user interface 818 may communicate signals, messages, and/or information back to the communications interface 812 or system circuitry 814.

The system 100 may be implemented in many different ways. In some examples, the system 100 may be implemented with one or more logical components. For example, the logical components of the system 100 may be hardware or a combination of hardware and software. The logical components may include the configuration interface 102, the digital twin extraction system 104, the digital twin segregation system 106, the segregation model 302, the segregation controller 304, the on-chain processing and storage system 108, the blockchain platform 112, the blockchain 114, the off-chain processing and storage system 110, the off-chain storage 116, and/or any component or subcomponent of the system 100. In some examples, each logic component may include one or more of an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 820, for example, that comprises instructions executable with the processor 816 or other processor to implement one or more of the features of the logical components. When any one of the logical components includes the portion of the memory that comprises instructions executable with the processor 816, the component may or may not include the processor 816. In some examples, each logical component may just be the portion of the memory 820 or other physical memory that comprises instructions executable with the processor 816, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system and its logic and data structures may be stored on, distributed across, or read from one or more types of computer readable storage media. Examples of the computer readable storage medium may include a hard disk, a floppy disk, a CD-ROM, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks, flash memory drives, floppy disks, and CD-ROMs. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media that is other than transitory. The functions, acts or tasks illustrated in the figures or described herein may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A method comprising:
receiving a first development object from a first devops tool;
receiving a second development object from a second devops tool;
identifying, in a segregation model graph, a first node and a second node, wherein the first node of the segregation model graph corresponds to the first development object and the second node of the segregation model graph corresponds to the second development object;
determining the first node of the segregation model graph is mapped to an off-chain storage classification and the second node of the segregation model graph is mapped to an on-chain storage classification;
in response to the first node of the segregation model graph being mapped to the off-chain storage classification;
storing the first development object in an off-chain storage;
generating a hash value of the first development object; and
storing the hash value of the first development object on a blockchain; and
in response to the second node of the segregation model graph being mapped to the on-chain storage classification:
storing the second development object on the blockchain.

2. The method of claim 1, wherein the first development object comprises a work product and the second development object comprises a participant identifier associated with the work product.

3. The method of claim 2, further comprising:
receiving event information generated by a third devops tool, wherein the event information is associated with the first development object, the second development object, or a combination thereof;
accessing a smart contract stored on the blockchain, wherein the smart contract stored on the blockchain comprises executable logic;
based on execution of the executable logic of the smart contract stored on the blockchain,
confirming the event information satisfies a predetermined criteria;
identifying the hash value of the first development object;
verifying the work product is stored in the off-chain storage; and
appending, to the blockchain, a reward token in response to satisfaction of the predetermined criteria and verification of the hash value of the first development object, wherein the reward token indicative of tokens is transferred to a developer account associated with the participant identifier associated with the work product.

4. The method of claim 3, wherein verifying the work product is stored in the off-chain storage further comprises:
obtaining the hash value of the first development object from the blockchain;
querying the off-chain storage based on the hash value of the first development object; and
obtaining the work product based on the hash value of the first development object, wherein the off-chain storage stores a mapping between the hash value of the first development object and the work product.

5. The method of claim 3, wherein verifying the work product is stored in the off-chain storage further comprises:
obtaining the work product from the off-chain storage;
generating a new hash value based on the obtained work product; and
determining the hash value of the first development object that matches the new hash value.

6. The method of claim 1, further comprising:
accessing a data extraction model comprising a first instruction and a second instruction, wherein the first instruction is configured to communicate with the first devops tool and obtain the first development object, and wherein the second instruction is configured to communicate with the second devops tool and obtain the second development object;
executing the first devops tool to receive the first development object; and
executing the second instruction to receive the second development object.

7. The method of claim 1, wherein identifying, in the segregation model graph, the first node and the second node further comprises:
determining the first development object includes a first identifier and the second development object includes a second identifier; and
querying the segregation model graph to identify the first node and the second node based on the first identifier and the second identifier, respectively.

8. A system comprising:
a processor, the processor configured to:
receive a first development object from a first devops tool;
receive a second development object from a second devops tool;
identify, in a segregation model graph, a first node and a second node, wherein the first node of the segregation model graph corresponds to the first development object and the second node of the segregation model graph corresponds to the second development object; and
determine the first node of the segregation model graph is mapped to an off-chain storage classification and the second node of the segregation model graph is mapped to an on-chain storage classification;
wherein the processor is further configured to, in response to the first node of the segregation model graph being mapped to the off-chain storage classification:
store the first development object in an off-chain storage;
generate a hash value of the first development object; and
store the hash value of the first development object on a blockchain; and wherein the processor is further configured to, in response to the second node of the segregation model graph being mapped to the on-chain storage classification: store the second development object on the blockchain.

9. The system of claim 8, wherein the processor is further configured to:
access a smart contract stored on the blockchain; and
execute logic of the smart contract stored on the blockchain, wherein the logic of the smart contract stored on the blockchain causes the processor to obtain the first development object from the off-chain storage and the second development object from the blockchain.

10. The system of claim 9, wherein to execute the logic of the smart contract stored on the blockchain, the processor is further configured to:
receive the hash value of the first development object from the blockchain;
query the off-chain storage based on the hash value of the first development object;
receive the first development object from the off-chain storage in response to the first development object being mapped to the hash value of the first development object in the off-chain storage; and
receive the second development object from the blockchain.

11. The system of claim 9, wherein to execute the logic of the smart contract stored on the blockchain, the processor is further configured to:
verify the first development object based on the hash value of the first development object;
generate a new hash value based on the first development object obtained from the off-chain storage; and
determine the hash value of the first development object that matches the new hash value.

12. The system of claim 8, wherein the first development object comprises a work product and the second development object comprises a participant identifier associated with the work product.

13. The system of claim 12, wherein the work product comprises at least one of software code, software test, test result, software artifact, or a combination thereof.

14. The system of claim 12, wherein the blockchain further comprises a smart contract, and wherein the processor is further configured to:
receive a metric that measures a quality of the work product based on a development policy; and
execute logic of the smart contract, wherein the logic causes the processor to:
determine the metric satisfies a predetermined criteria; and
submit a transaction to the blockchain in response to the metric satisfying the predetermined criteria, wherein the transaction comprises a record of a token being transferred to an account associated with the participant identifier associated with the work product.

15. A non-transitory computer readable storage medium comprising:
a plurality of instructions accessible by a processor, the plurality of instructions comprising:
instructions executable by the processor to receive a first development object from a first devops tool;
instructions executable by the processor to receive a second development object from a second devops tool;
instructions executable by the processor to identify, in a segregation model graph, a first node and a second node, wherein the first node of the segregation model graph corresponds to the first development object and the second node of the segregation model graph corresponds to the second development object;
instructions executable by the processor to determine the first node of the segregation model graph is mapped to an off-chain storage classification and the second node of the segregation model graph is mapped to an on-chain storage classification; and
instructions executable by the processor to, in response to the first node of the segregation model graph being mapped to the off-chain storage classification:
store the first development object in an off-chain storage;
generate a hash value of the first development object; and
store the hash value of the first development object on a blockchain; and
instructions executable by the processor to, in response to the second node of the segregation model graph being mapped to the on-chain storage classification:
store the second development object on the blockchain.

16. The non-transitory computer readable storage medium of claim 15, further comprising:
instructions executable by the processor to access a smart contract stored on the blockchain; and
instructions executable by the processor to cause execution of the smart contract stored on the blockchain, wherein the smart contract stored on the blockchain causes the processor to obtain the first development object from the off-chain storage and the second development object from the blockchain.

17. The non-transitory computer readable storage medium of claim 16, wherein the smart contract stored on the blockchain causes the processor to:
receive the hash value of the first development object from the blockchain;
query the off-chain storage based on the hash value of the first development object;
receive the first development object from the off-chain storage in response to the first development object being mapped to the hash value of the first development object in the off-chain storage; and
receive the second development object from the blockchain.

18. The non-transitory computer readable storage medium of claim 16, wherein the smart contract stored on the blockchain causes the processor to:
verify the first development object based on the hash value of the first development object;
generate a new hash value based on the first development object obtained from the off-chain storage; and
determine the hash value of the first development object that matches the new hash value.

19. The non-transitory computer readable storage medium of claim 15, wherein the first development object comprises a work product and the second development object comprises a participant identifier associated with the work product.

20. The non-transitory computer readable storage medium of claim 19, wherein the blockchain further comprises a smart contract, and wherein the non-transitory computer readable storage medium further comprises:
instructions executable by the processor to receive a metric that measures a quality of the work product based on a development policy; and
instructions executable by the processor to cause execution of the smart contract, wherein the smart contract causes the processor to:

determine the metric satisfies a predetermined criteria; and submit a transaction to the blockchain in response to the metric satisfying the predetermined criteria, wherein the transaction comprises a record of a token being transferred to an account associated with the participant identifier associated with the work product.

* * * * *